(12) United States Patent
Iacona

(10) Patent No.: US 6,357,214 B1
(45) Date of Patent: Mar. 19, 2002

(54) GRASS DETHATCHER

(76) Inventor: Fernando R. Iacona, 161-16 46$^{th}$ Ave., Flushing, NY (US) 11358

( * ) Notice: Subject to any disclaimer, the term of this patent is extended or adjusted under 35 U.S.C. 154(b) by 0 days.

(21) Appl. No.: 09/422,410

(22) Filed: Oct. 21, 1999

Related U.S. Application Data

(60) Provisional application No. 60/106,121, filed on Oct. 29, 1998.

(51) Int. Cl.$^7$ .......................... A01D 57/12; A01B 33/14
(52) U.S. Cl. .......................................... 56/12.7; 172/45
(58) Field of Search ................. 56/12.7, 13.2, 56/14.4, 17.2, 16.1, 364; 30/276; 172/13–17, 42, 45

(56) References Cited

U.S. PATENT DOCUMENTS

| 5,524,425 A | * | 6/1996 | Gallazzini | 56/364 |
| 5,577,374 A | * | 11/1996 | Huston | 56/12.1 |
| 6,158,202 A | * | 12/2000 | Jung | 56/12.7 |

* cited by examiner

*Primary Examiner*—Christopher J. Novosad
(74) *Attorney, Agent, or Firm*—Anthony J. Casella; Gerald E. Hespos

(57) ABSTRACT

A grass dethatcher includes a plurality of housings fixedly mounted on a rotatably shaft, with flexible nylon filaments secured to each housing. In operation, as the shaft is rotated, the centrifugal force extends each flexible nylon filament generally perpendicular to the horizontal shaft, and with the filaments in a radially disposed position to effect dethatching of the lawn.

13 Claims, 4 Drawing Sheets

GRASS DETHATCHER

This application claims priority on U.S. Provisional Appl. No. 60/106,121, filed Oct. 29, 1998.

BACKGROUND OF THE INVENTION

This invention relates to apparatus for dethatching a lawn.

Thatch is a mat of undecomposed plant material, consisting mainly of grass clippings, accumulated next to the soil in a lawn. Excessive thatch is undesired, since it chokes the roots of the grass, restricts exposure of the soil to the atmosphere, and causes run-off of water away from the soil. At present, thatch is often removed by raking and collecting the raked material. However, thatch is typically well embedded in a lawn and requires a large, time-consuming effort to be raked. "Walk behind" gas-powered dethatchers have been developed in the prior art to case the dethatching process. The prior art dethatchers, however, suffer from several drawbacks. First, the dethatchers are built for professional landscapers who need to regularly dethatch lawns, and, therefore, require a fast and efficient tool to accomplish the task. As such, the prior art dethatchers are built to professional standards, having size and power much greater than that needed for a homeowner, and at a relatively high expense. The high cost of the prior art dethatchers cannot be justified by the typical homeowner who will dethatch his lawn once or twice a year. Second, the prior art dethatchers utilize a completely metallic structure for extracting the thatch from a lawn. In particular, metallic claws or coils extend from a cylindrical, rotating housing, which are systematically passed into the grass to "kick up" the thatch. The loosened thatch is collected either by raking or blowing and properly disposed of. Unfortunately, the claws and coils are often damaged by hidden rocks, roots, etc. or tangled up with thatch material to completely loose effectiveness. As such, the claws and coils must be removed and either replaced by substitute parts or cleaned. Such removal, however, requires tools, such as an Allen wrench, box wrench, a screwdriver, etc. and a time-consuming effort.

It is an object to the subject invention to provide a dethatcher which uses a flexible filament.

It is also an object to the subject invention to provide a dethatcher which allows for quick and easy replacement of the dethatching elements.

SUMMARY OF THE INVENTION

The aforementioned objects are met by a dethatcher which utilizes a flexible filament, such as a nylon trimmer line typically used which rotating trimmers and edgers. Additionally, the subject invention utilizes a clamping mechanism which allows for the attachment of flexible filament without additional tools.

The invention includes a horizontally disposed rotating shaft to which is mounted one or more cylindrical housing. At least one strand of flexible filament is mounted to the housing(s) to radially extend therefrom. A motor is coupled to the shaft to cause rotation thereof, with the flexible filament. As such, the rotating shaft can be guided to lower the end of the spinning filament into a lawn to forcibly lift embedded thatch.

The filaments are preferably circumferentially staggered along the length of the housing(s) so that the filaments engage the thatch sequentially rather than in unison. The shaft can be driven either by an electrical motor or a gas-powered motor. With either source of motive force, it is preferred that wheels be mounted to the dethatcher to ease operation thereof. The use of flexible filament allows for a light, electrically-powered apparatus to be formed in accordance with this invention, which is ideal for home use. Additionally, the invention can also be used in conjunction with a heavy-duty, gas-powered model intended for professional gardeners and landscapers. It is preferred that each of the flexible filaments be securely held in the housing(s) by the clamping mechanism disclosed in U.S. Pat. No. 5,758,424, which issued on Jun. 2, 1998 and of which the inventor herein is a co-inventor. The disclosure of U.S. Pat. No. 5,758,424 is incorporated by reference herein.

DETAILED DESCRIPTION

Figure 1:
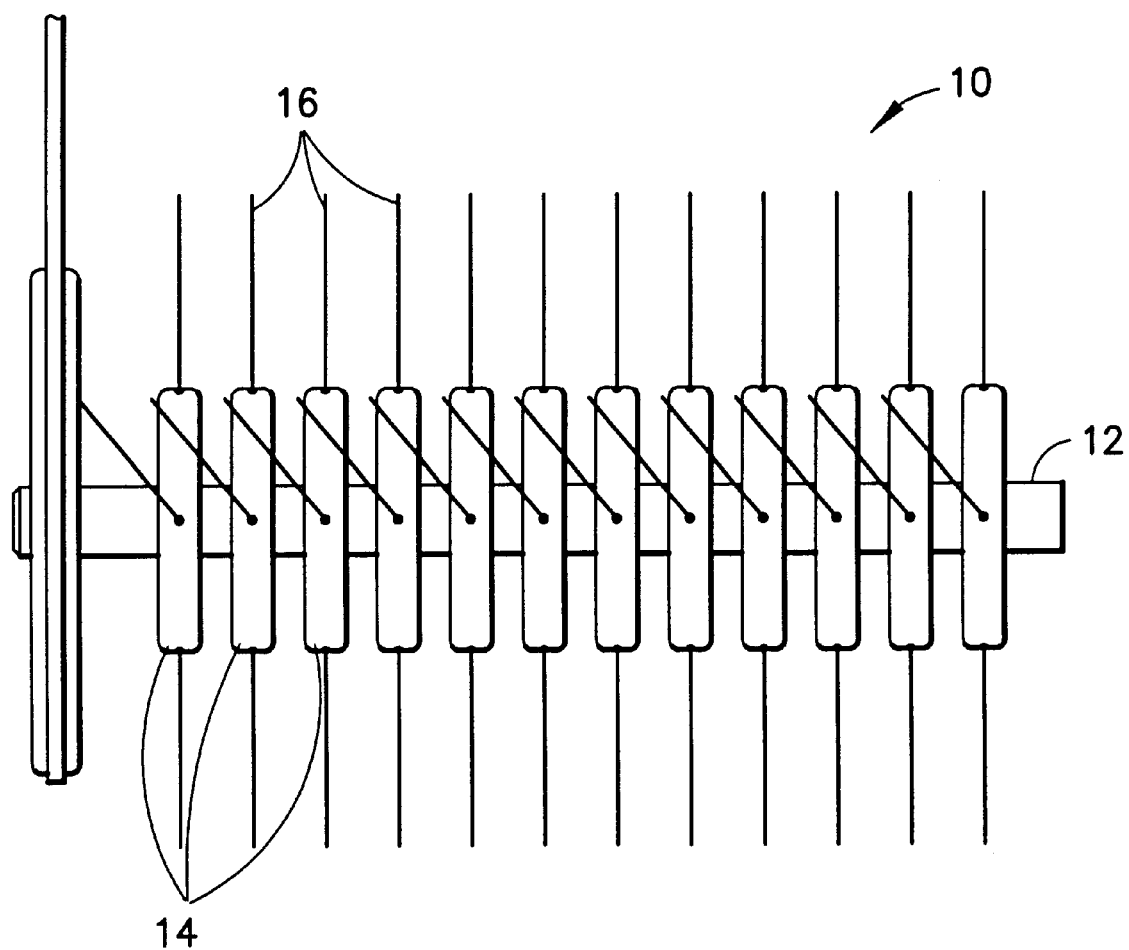
FIG. 1 shows a dethatcher element formed in accordance with the subject invention.
Figure 2:
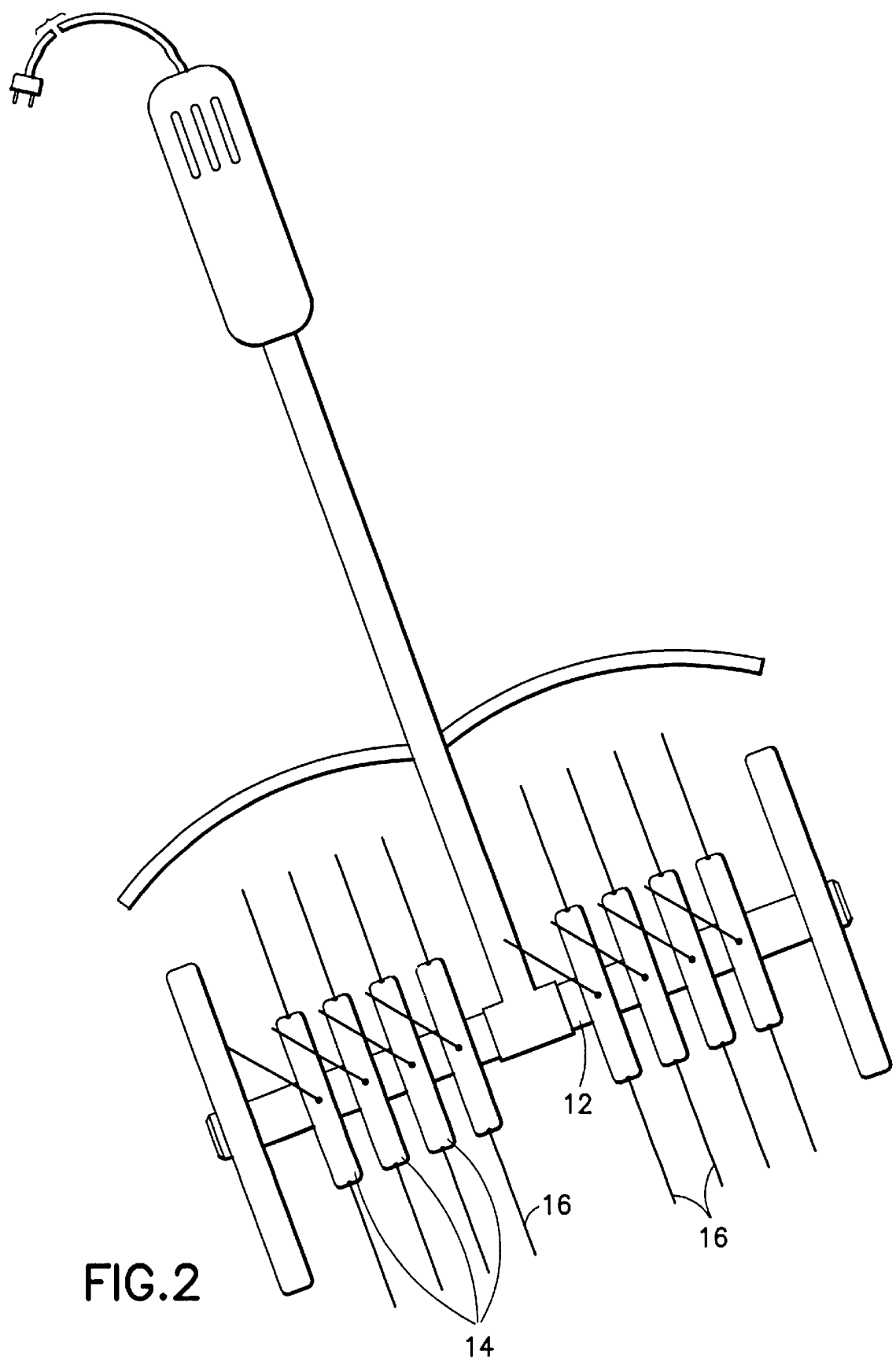
FIG. 2 shows an electrically powered version of the invention herein.
Figure 3:
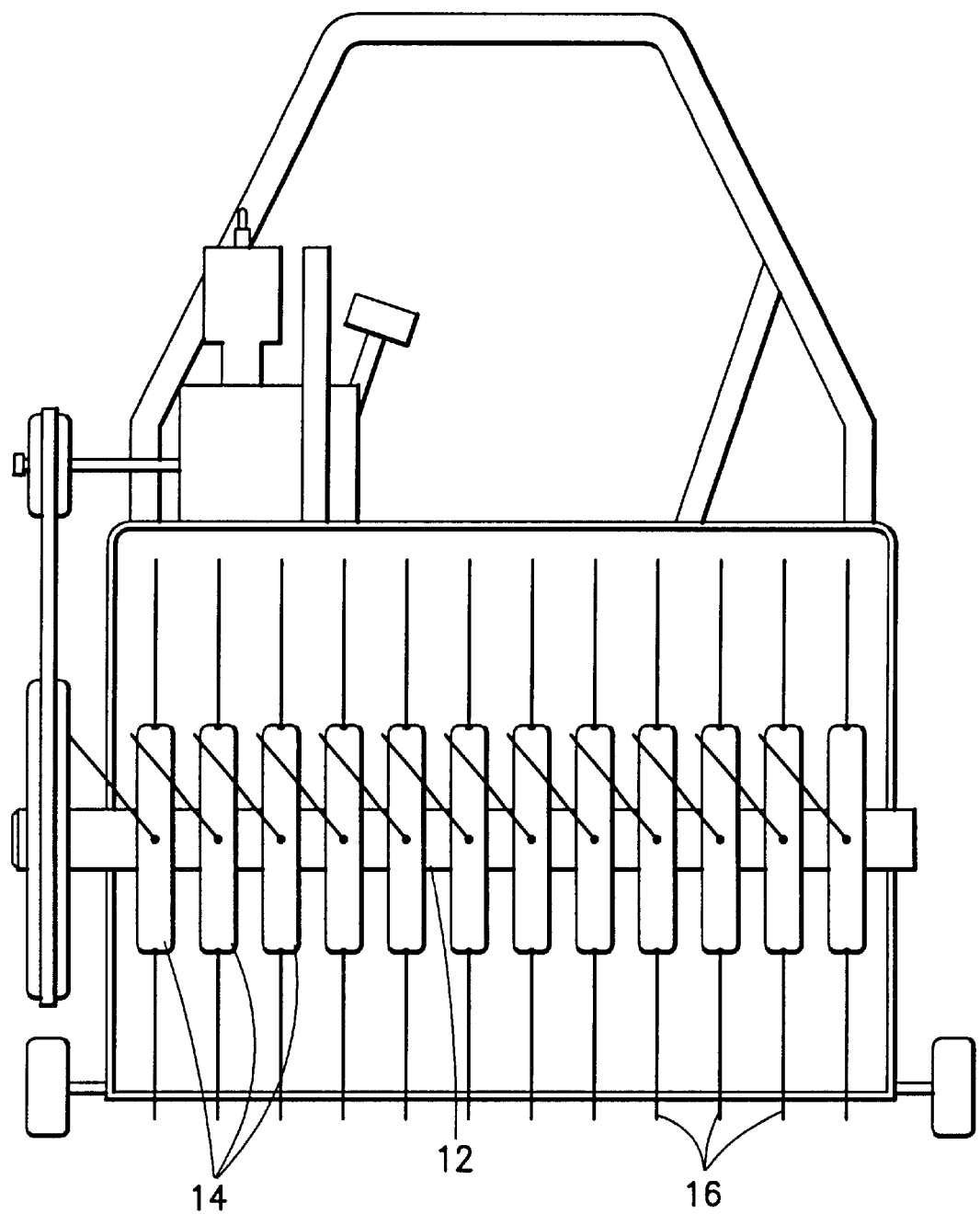
FIG. 3 shows a gas powered version of the invention herein.
Figure 4:
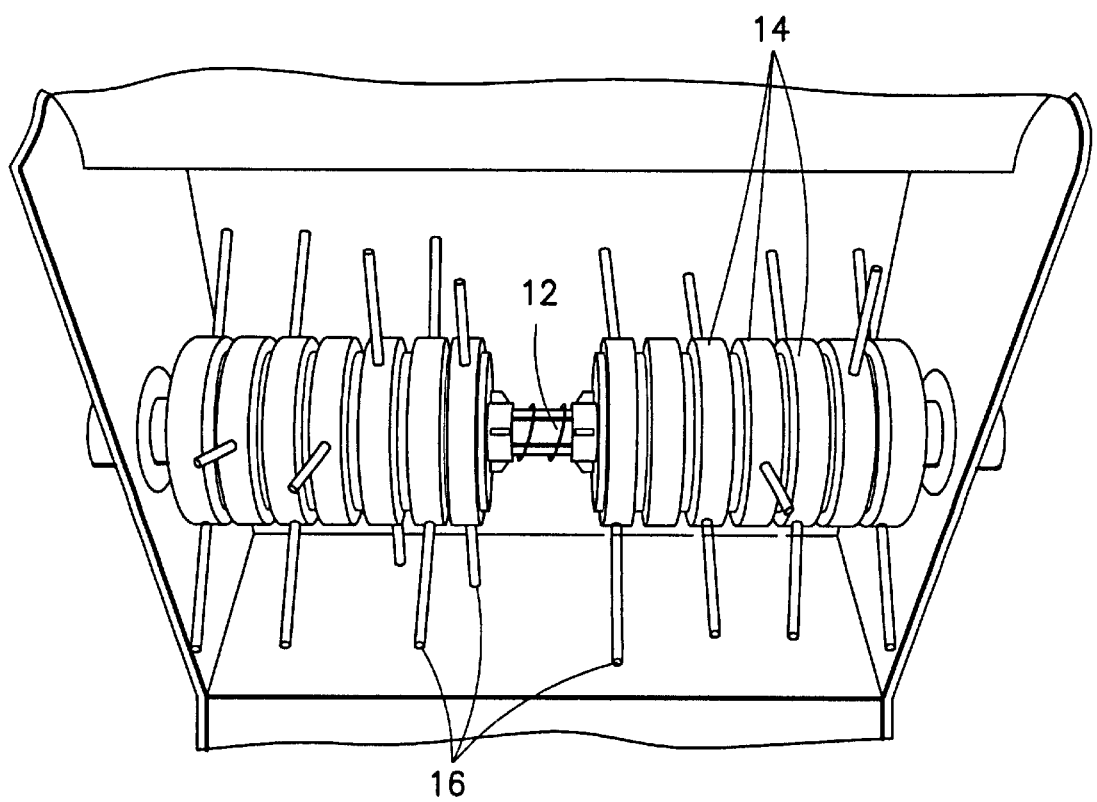
FIG. 4 is a perspective view of the dethatcher element of the gas powered version of the invention herein.

The FIGS. generally show a dethatching element 10 which includes a drive shaft 12, cylindrical housing(s) 14 and lengths of flexible filament 16. The cylindrical housing (s) 14 are mounted on the shaft 12 to allow rotation therewith. Any mode of coupling can be use to couple a source of rotational force to the shaft 12, such as, for example as shown in FIG. 1, a pulley driven through a belt coupled to a motor (not shown).

The filaments 16 are made of flexible material, preferably nylon. Accordingly, the flexibility of the filaments 16 provides more forgiveness than the rigid prior art dethatching claws and coils, thus, reducing the likelihood of failure from the prior art. Additionally, the filaments 16 are less likely to become entangled with thatch.

Any number of the housing(s) 14 can be used. For example, as shown in the FIGS., a plurality of the housing(s) 14 can be used. Each housing 14 may be constructed similar to the rotatable cutter heads disclosed and illustrated in U.S. Pat. No. 5,758,424. Alternatively, one continuous, cylindrical housing may be provided being formed with a plurality of circumferentially-spaced and axially-spaced apertures. Regardless of the number of the lousing(s) 14, it is preferred that provisions be made for the housing(s) 14 to accommodate a plurality of the flexible filaments 16 at both circumferentially-spaced and axially-spaced locations. In a preferred arrangement, rings of the filaments 16 are located about the shaft 12 at axially spaced locations along the shaft 12. Also, it is preferred that the filaments 16 be staggered radially circumferentially from ring to ring, so that in use, neighboring filaments 16 do not engage the thatch in a random unison, but rather in sequence. The filaments 16 can be mounted to the housing(s) 14 using any technique known by those skilled in the art. For example, a screw-tightened clamp may be used. It is, however, preferred that the clamping mechanism of U.S. Pat. No. 5,758,424 be utilized to avoid the use of tools, and to readily facilitate the replacement of filaments 16 which may be broken during the dethatching operation.

As is readily apparent, numerous modifications and changes may readily occur to those skilled in the art, and hence it is not desired to limit the invention to the exact construction and operation shown and described, and accordingly all suitable modification equivalents may be resorted to as falling within the scope of the invention as claimed.

What is claimed is:

1. A grass dethatcher comprising:

a rotatable shaft;

a plurality of housings fixedly mounted on said shaft;

flexible filaments secured to each of said housings, said filaments being disposed generally perpendicular to the axis of said shaft during operation of said grass dethatcher; and means for rotating said shaft.

2. A grass dethatcher as in claim 1 wherein said flexible filaments are made of nylon material.

3. A grass dethatcher as in claim 1 wherein each of said filaments is releaseably connected to a housing.

4. A grass dethatcher as in claim 1 wherein the filaments in adjacent housings are radially staggered so as to sequentially engage the thatch material during operation of the grass dethatcher.

5. A grass dethatcher as in claim 1 further including a frame assembly for supporting said rotatable shaft, with said frame assembly including wheels.

6. A grass dethatcher as in claim 5 wherein said means for rotating said rotatable shaft is an electric motor mounted on said frame.

7. A grass dethatcher as in claim 5 wherein said means for rotating said shaft comprises a gasoline powered motor mounted on said frame assembly and operatively connected to said rotatably shaft.

8. A grass dethatcher comprising:

a frame assembly including wheels and having a generally horizontally extending rotatable shaft;

housing means fixedly secured to said shaft for rotation therewith;

a plurality of flexible filaments secured to said housing means and extending radially outwardly therefrom, said filaments being disposed generally perpendicular to the horizontal axis of said shaft during operation of said grass dethatcher; and drive means secured to said frame assembly and operatively connected to said rotatable shaft whereby, during operation of said drive means, the flexible filaments are rotated about the horizontal shaft and extend a sufficient distance for the dethatching a lawn.

9. A grass dethatcher as in claim 8 wherein said filaments are made of nylon material.

10. A grass dethatcher as in claim 8 wherein each of said filaments is releasably connected to said housing.

11. A grass dethatcher as in claim 8 wherein said drive means is an electric motor mounted on said frame.

12. A grass dethatcher as in claim 8 wherein said drive means comprises a gasoline powered motor mounted on said frame assembly.

13. A grass dethatcher as in claim 8 wherein said flexible filaments are spaced along the length of said housing, and are radially circumferentially staggered along the length of said housing.

* * * * *